No. 773,890. PATENTED NOV. 1, 1904.
N. PAULSEN.
HARROW ATTACHMENT.
APPLICATION FILED NOV. 20, 1903.
NO MODEL. 2 SHEETS—SHEET 1.
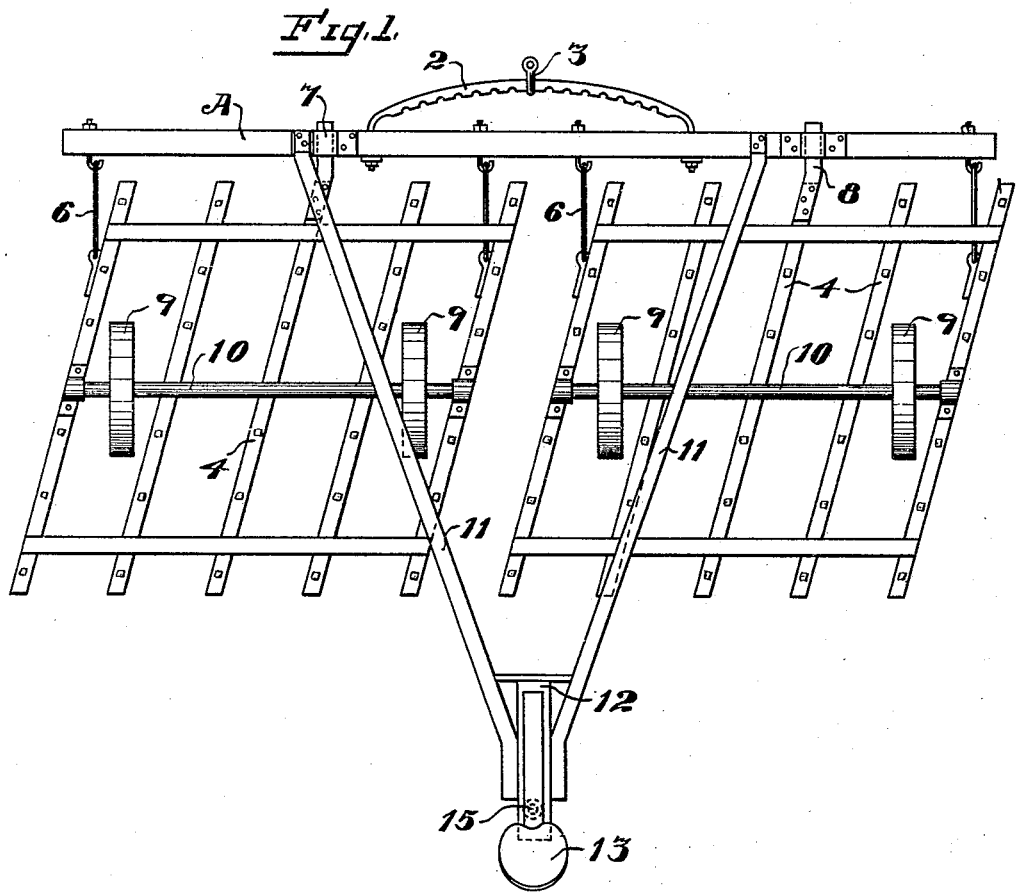
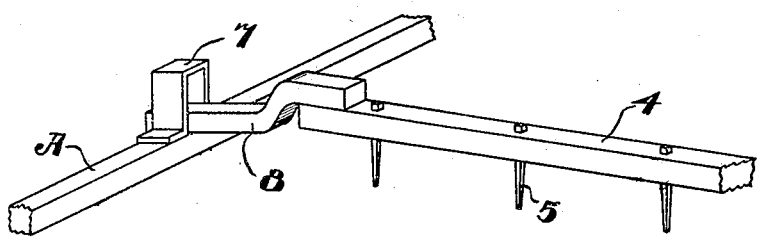

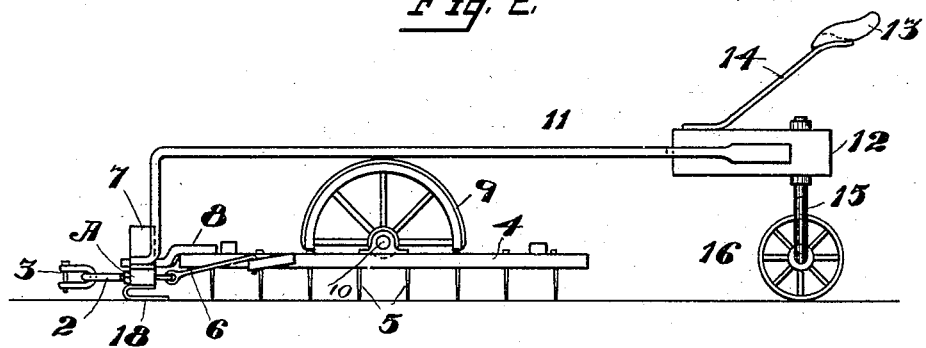

No. 773,890. Patented November 1, 1904.

UNITED STATES PATENT OFFICE.

NAHMEN PAULSEN, OF SAN LUCAS, CALIFORNIA.

HARROW ATTACHMENT.

SPECIFICATION forming part of Letters Patent No. 773,890, dated November 1, 1904.

Application filed November 20, 1903. Serial No. 181,910. (No model.)

*To all whom it may concern:*

Be it known that I, NAHMEN PAULSEN, a citizen of the United States, residing at San Lucas, in the county of Monterey and State of California, have invented new and useful Improvements in Harrow Attachments, of which the following is a specification.

My invention relates to improvements in harrows and attachments therefor; and it consists of the parts and the constructions and combinations of parts hereinafter described and claimed.

It further comprises details of construction, which will be more fully explained by reference to the accompanying drawings, in which—

Figure 1 is a plan view of my invention. Fig. 2 is a side elevation of same. Fig. 3 is a perspective detail of yoke and guide-bar.

In the construction of harrows in which a gang or series of harrows are drawn together it is customary to unite the tooth-bars parallel to each other and oblique to the line of draft and to so connect the harrows with the draft or evener bar that they will be drawn over the ground so that the teeth of the harrows will travel in different lines, and thus properly cultivate the ground over which they travel. In operating such harrows upon sidehills, however, the loose-link connections between the harrows and the draft-bar allow the harrows to slide to one side or down the hill, and this prevents the proper cultivation of the ground.

It is the object of my invention to overcome this difficulty, which I effect as follows:

As shown in the accompanying drawings, A is the draft-bar, having a segmental or equivalent notched clevis 2, to which the link 3 may be connected at any point between its ends, this link engaging with any one of the notches, so that the power is applied to the draft-bar in such a manner as to draw the harrows over the ground in any desired relation therewith. The harrows 4 may be of any suitable or desired number, depending upon the length of the draft-bar. At present I have shown two of these harrows, the frames of which are united oblique to the line of draft and serve to receive the teeth 5, which are secured in the frames or tooth-bars in such relation to each other that they will not travel in the same lines, but will travel over different parts of the ground, and thus cultivate the whole thoroughly. These frames are connected with the draft-bar A by links 6, the front ends of which connect with hooks or their equivalent upon the draft-bar, and the rear ends are loosely connected with the harrow-frame, as shown. These connections allow the harrows to swing from side to side, as well as to move vertically, to accommodate themselves to undulations of the ground, and in order to prevent too much side movement of the harrows and a tendency to slide down the hill when working upon hillsides I have shown guide connections with the draft-bar as follows: Upon the draft-bar at suitable points with relation to the harrows are fixed U-shaped yokes 7, and 8 are guide-arms bolted to the front ends of the timbers of the harrow-frames and extending forward into and through the yokes 7, as shown. These arms or bars 8 are here shown as bent downwardly, so that the front ends are somewhat lower than the rear ends, and the yokes 7 are high enough to allow a considerable vertical movement of the arms 8 to allow the harrow to follow the undulations of the ground and also to allow it to be raised clear of the ground when it is desired to clear the teeth of obstructions or for other purposes. This clearing of the teeth is effected by means of segments 9, mounted upon shafts 10, journaled transversely across the harrow-frames and capable of revolving when desired, so that the peripheries of the segments will roll upon the ground, and thus lift the harrow sufficiently to allow accumulations of trash to be cleared away. As soon as the partial revolution which represents the peripheries of the segments is completed the harrow will be allowed to drop back upon the ground and continue its work.

In order to conveniently accommodate the operator, I have shown arms or bars 11, the front ends of which are attached to the draft-bar A at a considerable distance apart. From these points of attachment the bars 11 converge toward the rear at a sufficient height above the harrow-frame and at the rear are united with a short beam 12. Upon this beam is fixed a seat 13, preferably mounted upon a spring-arm 14, and through the beam, which is of sufficient depth for the purpose, extends a shaft 15, the lower end of which serves as the journal for a single wheel 16.

In order to prevent the sagging and dropping of the draft-bar, I have shown curved shoes 18, fixed beneath it in such a manner as to ride upon the surface of the ground and to properly support the draft-bar.

Having thus described my invention, what I claim, and desire to secure by Letters Patent, is—

1. The combination with a harrow of a draft-bar, links by which the harrow is loosely connected with said bar, vertical open guides fixed to the draft-bar and arms fixed to the front ends of the harrow-frame extending into the guides and capable of rising and falling therein.

2. The combination with a plurality of harrows of a draft-bar extending in front thereof, links loosely connecting the harrows with the draft-bar, a plurality of vertical guides on the draft-bar and bars fixed to the front of the harrows and adapted to travel upon said guides.

3. The combination of a plurality of harrows, a draft-bar, loose-link connections between the harrows and the draft-bar, vertically-disposed guides by which side motion of the harrows with relation to the draft-bar is limited, a horizontal segmental notched clevis and a draft-link adapted to connect with the clevis at any point between its ends.

4. The combination with a plurality of harrows, a draft-bar and loose-link connections between the harrows and the bar, guides between the harrows and the draft-bar and permitting of a vertical movement of the former, and shoes connected with the draft-bar and adapted to travel upon the ground.

5. The combination of a harrow, a draft-bar, loose links by which the harrow is connected with the draft-bar, vertical guide connections between the draft-bar and harrow, a shaft journaled across the harrow and substantially parallel with the draft-bar, segments fixed upon the shaft and adapted to raise the harrow when the peripheries of said segments roll upon the ground and allow the harrow to drop when the intermediate portion is presented downwardly.

In testimony whereof I have hereunto set my hand in presence of two subscribing witnesses.

NAHMEN PAULSEN.

Witnesses:
E. C. GRISWOLD,
G. K. MATTESON.